(12) United States Patent
Qin et al.

(10) Patent No.: US 7,333,607 B2
(45) Date of Patent: Feb. 19, 2008

(54) REPLACEABLE PANEL DEVICE FOR A HANDSET

(75) Inventors: Shui Yuan Qin, Shenzhen (CN); Bao Jiang Chen, Shenzhen (CN); Jiang Yuan He, Shenzhen (CN); Ying Liang Tu, Shenzhen (CN)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 746 days.

(21) Appl. No.: 10/894,760

(22) Filed: Jul. 19, 2004

(65) Prior Publication Data

US 2005/0013434 A1 Jan. 20, 2005

(30) Foreign Application Priority Data

Jul. 19, 2003 (CN) ............................ 03 2 67856

(51) Int. Cl.
*H04M 1/00* (2006.01)
*H04M 9/00* (2006.01)
(52) U.S. Cl. .............. 379/433.11; 379/447; 379/428.01
(58) Field of Classification Search .......... 379/428.01, 379/433.11, 434, 447; 361/683, 728; 455/575.1, 455/575.8, 90.3
See application file for complete search history.

(56) References Cited

U.S. PATENT DOCUMENTS

| 5,848,152 | A | * | 12/1998 | Slipy et al. | ............ 379/433.13 |
| 5,955,700 | A | * | 9/1999 | Slipy et al. | ................... 174/50 |
| 5,982,881 | A | * | 11/1999 | Mischenko | ............ 379/433.11 |
| 6,913,297 | B2 | * | 7/2005 | Jackson et al. | ............. 292/196 |
| 7,002,073 | B2 | * | 2/2006 | Lai et al. | ...................... 174/50 |
| 7,149,559 | B2 | * | 12/2006 | Qin et al. | ................ 455/575.8 |
| 7,209,363 | B2 | * | 4/2007 | Liu et al. | .................... 361/801 |
| 2004/0266498 | A1 | * | 12/2004 | Qin et al. | ................ 455/575.1 |
| 2005/0009588 | A1 | * | 1/2005 | Qin et al. | ................ 455/575.8 |
| 2005/0136995 | A1 | * | 6/2005 | Robertson, Jr. | .......... 455/575.1 |

* cited by examiner

*Primary Examiner*—Curtis Kuntz
*Assistant Examiner*—Phylesha L Dabney
(74) *Attorney, Agent, or Firm*—Wei Te Chung

(57) ABSTRACT

A replaceable panel device (1) includes a panel (20) with a mounting portion (24), a locking subassembly (30), and a top cover (40) with a block (45). The mounting portion has at least one slideway (241), a recess (242), and two locating grooves (243). The locking subassembly is accommodated in the mounting portion of the panel. The locking subassembly has a button (31), an elastic rod (32), and a slider (33). The button has at least one rail (312), a hole (313) defined at top of the rail. The slider has at least one slot (331) and a rabbet (332). The slider is received in the recess. The rail is received through the slideway and the slot. The elastic rod is received through the hole. Ends of the elastic rod are located in the locating grooves. The rabbet engagingly receives the block of the top cover.

18 Claims, 8 Drawing Sheets

REPLACEABLE PANEL DEVICE FOR A HANDSET

BACKGROUND OF THE INVENTION

1. Field of the Invention

The present invention generally relates to replaceable panel devices, and more particularly to a replaceable panel device used in portable electrical apparatuses such as mobile phone handsets and PDAs.

2. Description of Prior Art

Portable electronic apparatuses, such as mobile phone handsets and PDAs, are in widespread use around the world. There is a growing need to provide consumers with a handset that has a replaceable panel, in order to conveniently change the aesthetic appearance of the handset.

A conventional replaceable panel device is used in the Alcatel OT310 type handset. A panel is mounted on a body of a handset by the replaceable panel device. The panel has a clasp extending from an end thereof. A plurality of clips extends from two sides of the panel. The body of the handset has a clasp hole and a plurality of clip holes defined therein. The panel is mounted on the body of the handset by engagement of the clasp in the clasp hole, and by engagement of the clips in the clip holes. When a user want to separate the panel from the body of the handset, he/she applies force on a portion of the panel where the clasp is located, and detaches the panel from the body of the handset.

However, the panel of the conventional replaceable panel device is separable from the body of the handset only by the application of force. It can be hard to separate the panel from the body, and it is not easy to control the correct amount of force needed. Furthermore, the panel is liable to become damaged after it has been detached from the body a number of times.

A replaceable panel device for a handset which has a simple structure, firm fixing and easy operation is desired.

SUMMARY OF THE INVENTION

Accordingly, an object of the present invention is to provide a replaceable panel device for a handset which has a simple structure, firm fixing and easy operation.

To achieve the above object, a replaceable panel device in accordance with the present invention includes a panel with a mounting portion, a locking subassembly, and a top cover with a block. The mounting portion has at least one slideway, a recess, and two locating grooves. The locking subassembly is accommodated in the mounting portion of the panel. The locking subassembly has a button, an elastic rod, and a slider. The button has at least one rail, a hole defined at top of the rail. The slider has at least one slot and a rabbet. The slider is received in the recess. The rail is received through the slideway and the slot. The elastic rod is received through the hole. Ends of the elastic rod are located in the locating grooves. The rabbet engagingly receives the block of the top cover to secure the panel to the top cover.

Other objects, advantages and novel features of the present invention will be drawn from the following detailed description of preferred embodiments of the present invention with the attached drawings, in which:

DETAILED DESCRIPTION OF PREFERRED EMBODIMENTS

Figure 1:
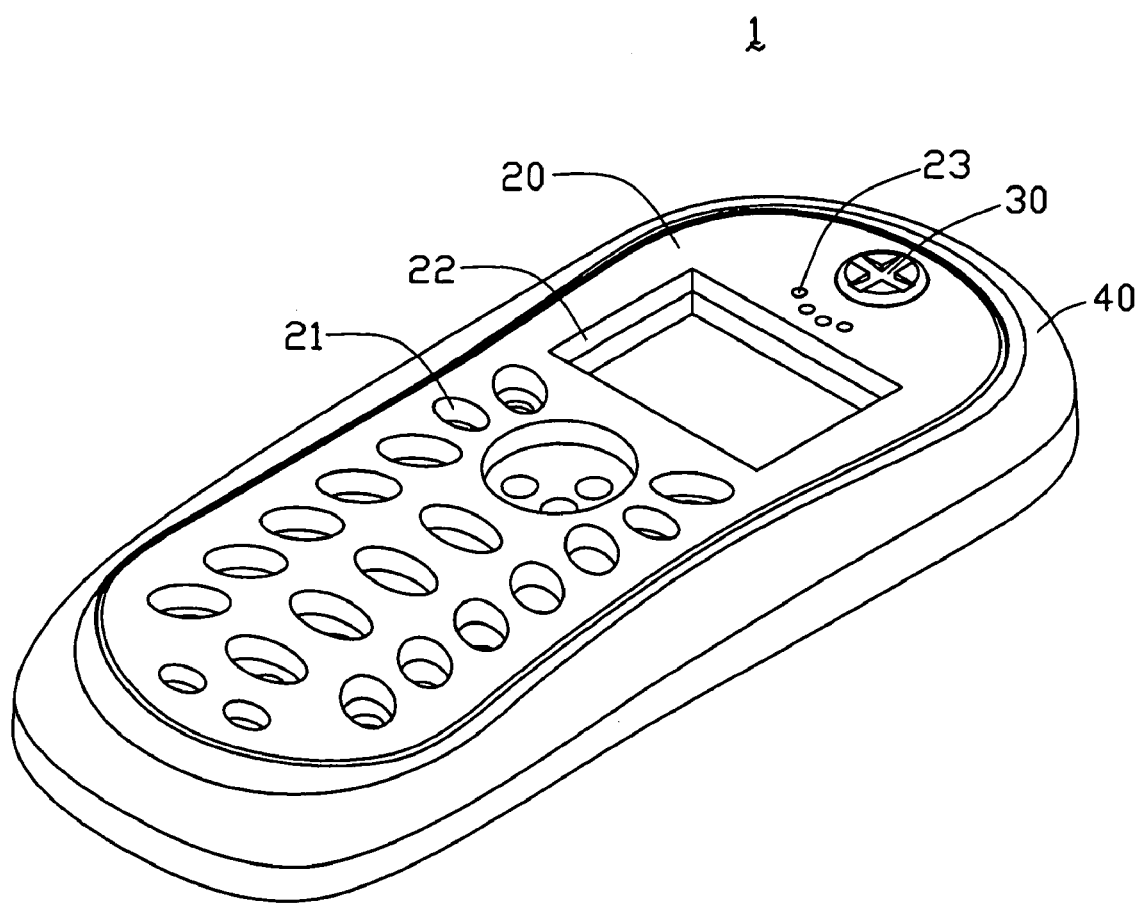
FIG. 1 is an isometric view of a replaceable panel device in accordance with a first embodiment of the present invention.

Referring to FIG. 1, a replaceable panel device 1 for a handset in accordance with a first embodiment of the present invention has a panel 20, a locking subassembly 30, and a top cover 40. The panel 20 is mounted on the top cover 40 by the locking subassembly 30.

Figure 2:
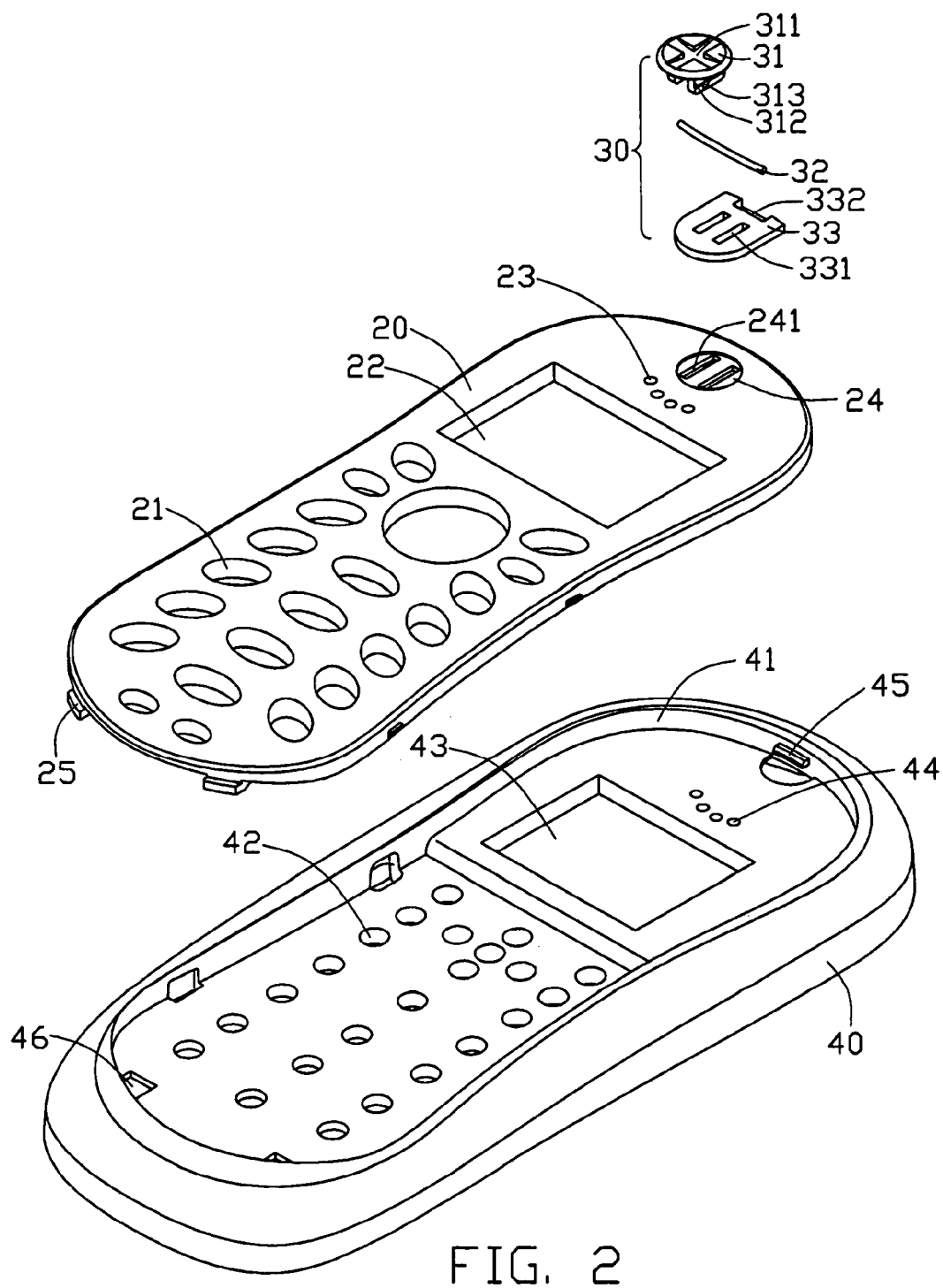
FIG. 2 is an exploded view of the replaceable panel device shown in FIG. 1.
Figure 3:
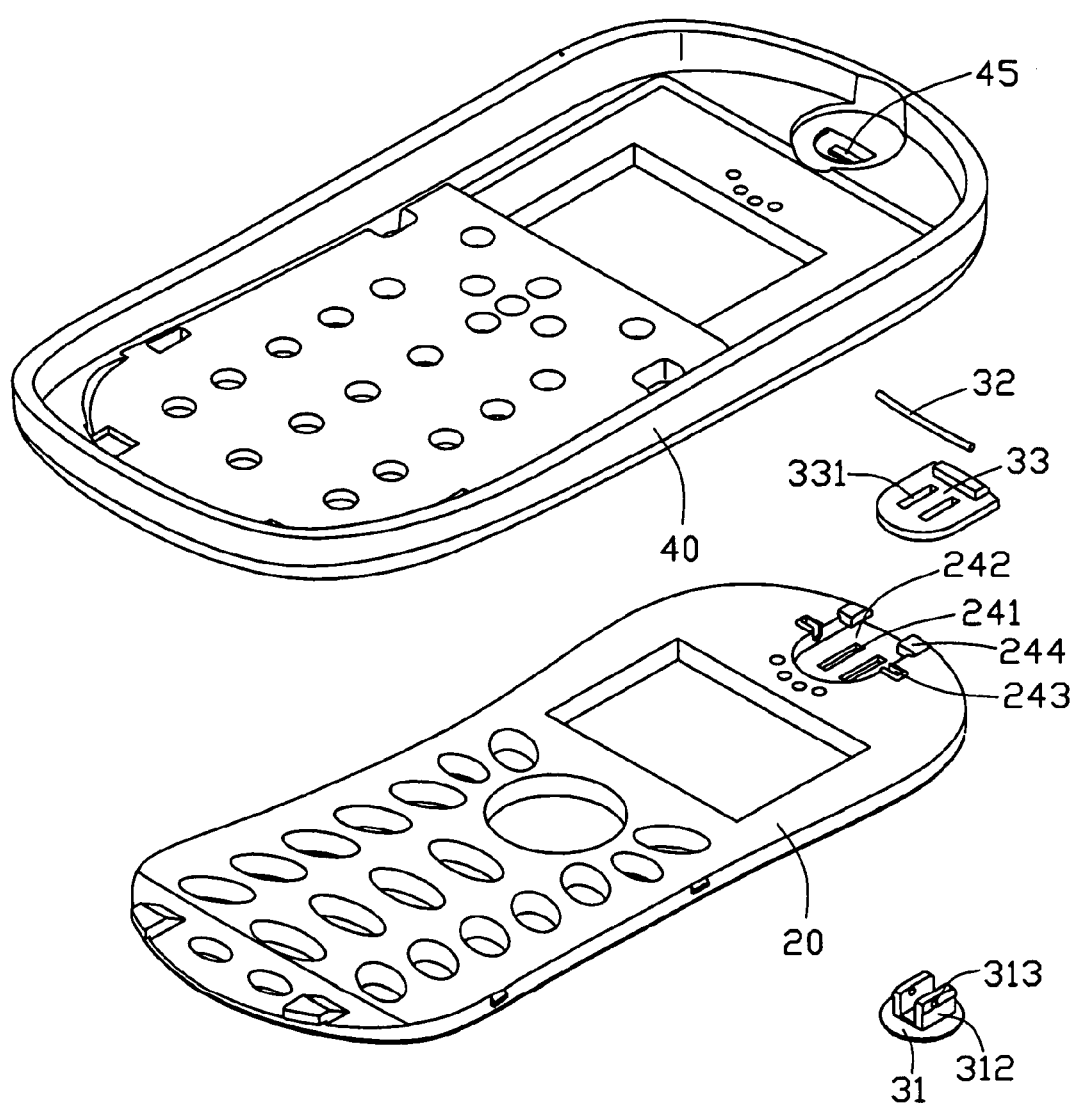
FIG. 3 is an exploded, isometric view of the replaceable panel device shown in FIG. 1, but viewed from a reverse direction.

Also referring to FIGS. 2 and 3, the panel 20 has a plurality of first keyholes 21, a first display window 22, a plurality of first earphone holes 23, and a mounting portion 24. The first display window 22 is defined in an upper portion of the panel 20. The first keyholes 21 are defined below the first display window 22. The first earphone holes 23 and the mounting portion 24 are defined above the first display window 22. A plurality of protuberances 25 is defined at a peripheral edge of the panel 20. The mounting portion 24 has two slideways 241, a recess 242, and two locating grooves 243. The slideways 241 are parallel to each other, and run through the panel 20. The recess 242 is defined in an inner surface (not labeled) of the panel 20, in communication with the slideways 241. The locating grooves 243 are defined in the inner surface of the panel 20, at respective opposite sides of and in communication with the recess 242. Two protrusions 244 are formed on the inner surface of the panel 20 at opposite sides of the recess 242 respectively.

The locking subassembly 30 comprises a button 31, an elastic rod 32, and a slider 33. A plurality of grooves 311 is defined in a first main surface of the button 31. Two rails 312 extend from an opposite second main surface of the button 31. Two holes 313 are defined in lower ends of the rails 312 respectively. The rails 312 are slidably received in the slideways 241 of the panel 20. The elastic rod 32 has a diameter corresponding to a diameter of the holes 313 and a width of the locating grooves 243 of the panel 20. The slider 33 has two parallel slots 331 and a rabbet 332. A width of each slot 331 is slightly greater than a corresponding width of each rail 312, so that the rails 312 are slidably received in the slots 331. The rabbet 332 is defined at an upper end of the slider 33.

The top cover 40 has a housing 41 for accommodating the panel 20. A plurality of second keyholes 42, a second display window 43, a plurality of second earphone holes 44 and a block 45 are defined on the top cover 40. The second keyholes 42, the second display window 43 and the second earphone holes 44 respectively correspond to the first keyholes 21, the first display window 22 and the first earphone holes 23 of the panel 20. The housing 41 has a plurality of recesses 46, for receiving the protuberances 25 of the panel 20. The block 45 extends from an upper end of the housing 41, and corresponds to the rabbet 332 of the slider 33.

Figure 4:
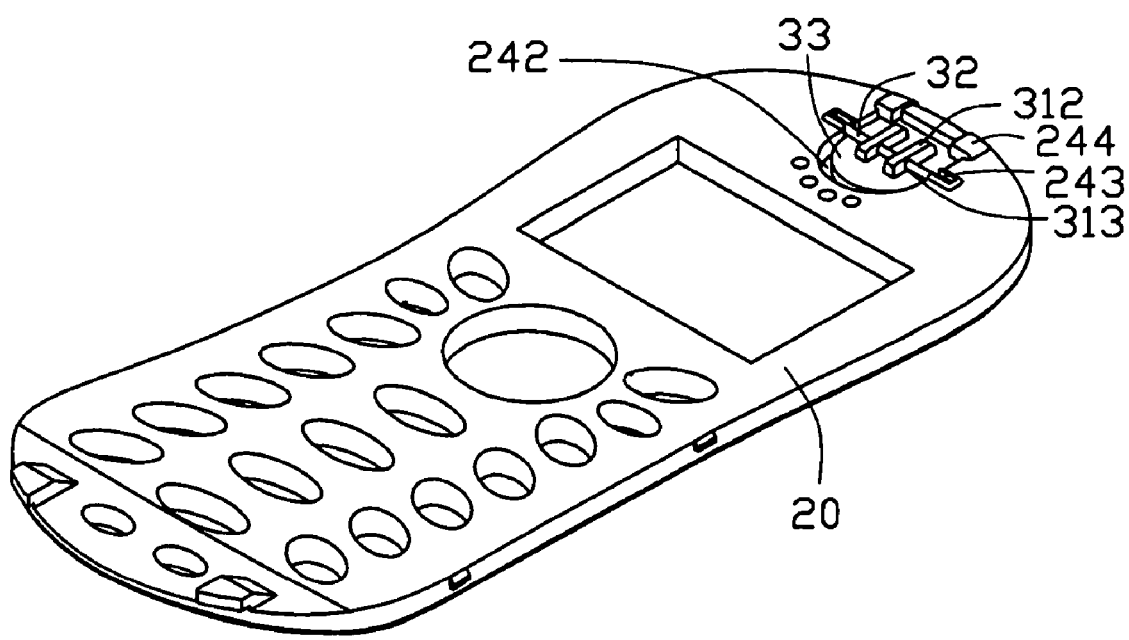
FIG. 4 is an assembled, isometric view of a locking subassembly and a top cover of the replaceable panel device shown in FIG. 1, but viewed from a reverse direction.
Figure 5:
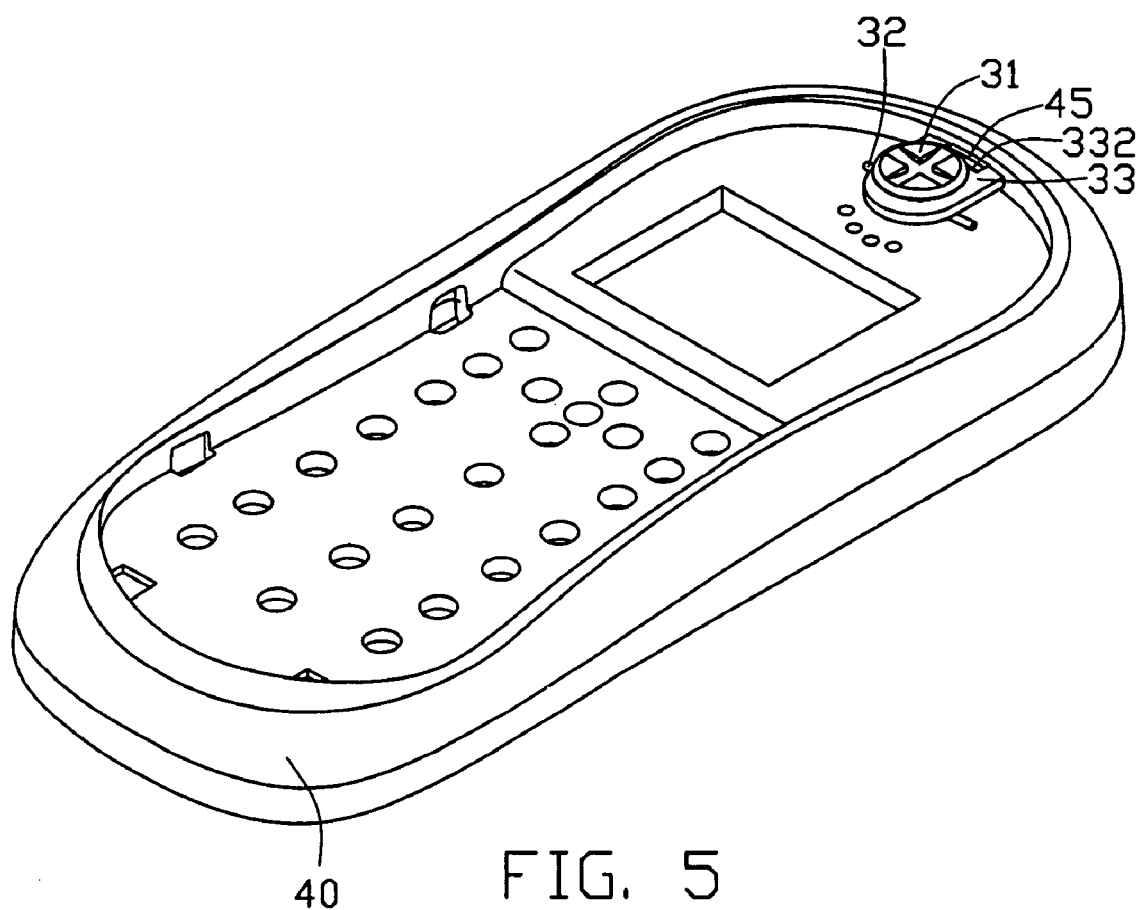
FIG. 5 is an assembled, isometric view of certain parts of the replaceable panel device shown in FIG. 1, showing a slider of the locking subassembly mating with a block of the top cover.
Figure 6:
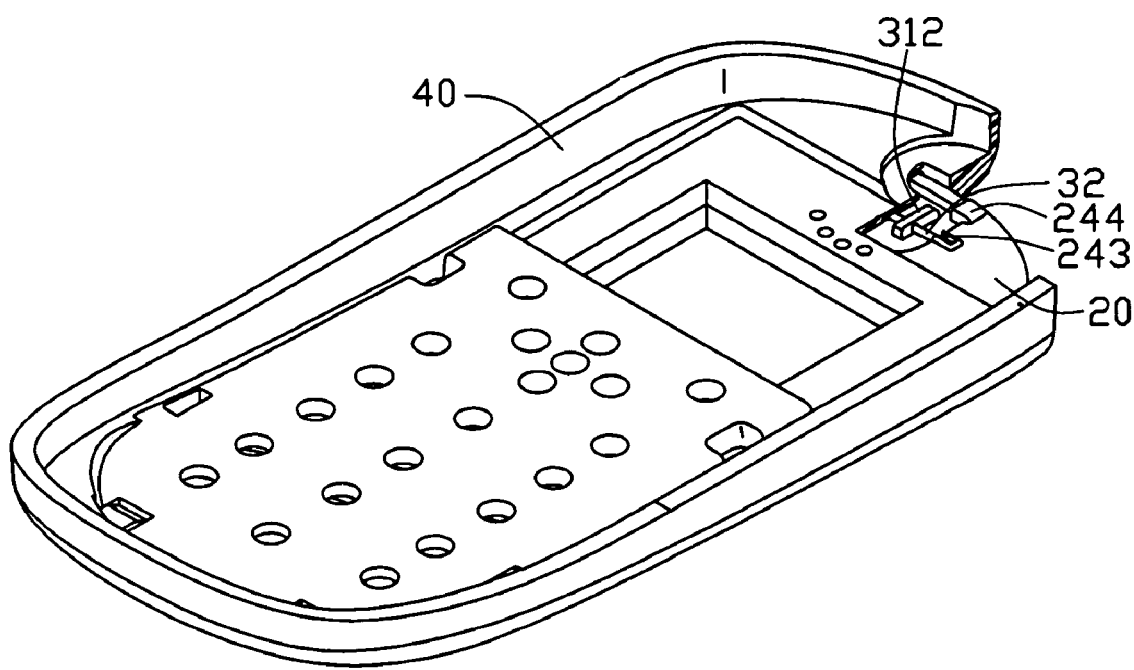
FIG. 6 is an isometric view of the replaceable panel device shown in FIG. 1, but viewed from a reverse direction and partly cut away.

Also referring to FIGS. 4-6, in assembly, firstly, the locking subassembly 30 is mounted in the mounting portion 24 of the panel 20. The slider 33 is received in the recess 242, and is restricted by the protrusions 244. The rails 312 of the button 31 are received through the slideways 241 and slots 331 in that sequence. The elastic rod 32 is received through the holes 313 of the rails 312, and ends of the elastic rod 32 are located in the locating grooves 243.

Secondly, the panel 20 is mounted on the top cover 40. The recesses 46 of the top cover 40 engagingly receive the protuberances 25 of the panel 20, and the panel 20 is thus fixed in the housing 41 of the top cover 40. The button 31 is pushed toward a lower end of the top cover 40, with the grooves 311 facilitating gripping of the button 31. The rails 312 slide along the slideways 241, and the elastic rod 32 is bent. The rails 312 in the slots 331 drive the slider 33 to slide in the recess 242 toward the lower end of the top cover 40. Then, pressure on the button 31 is released. The elastic rod 32 rebounds back toward its original shape, and drives the rails 312 and the slider 33 to slide back toward an upper end of the top cover 40. The rabbet 332 engagingly receives the block 45 of the top cover 40, so as to secure the panel 20 to the top cover 40.

To remove the panel 20 from the top cover 40, the button 31 is pushed toward the lower end of the top cover 40. The block 45 is disengaged from the rabbet 332. Then, the operator turns the handset upside-down so that the panel 20 is under the top cover 40. The panel 20 is then easily removed from the top cover 40 with the assistance of gravity.

Figure 7:
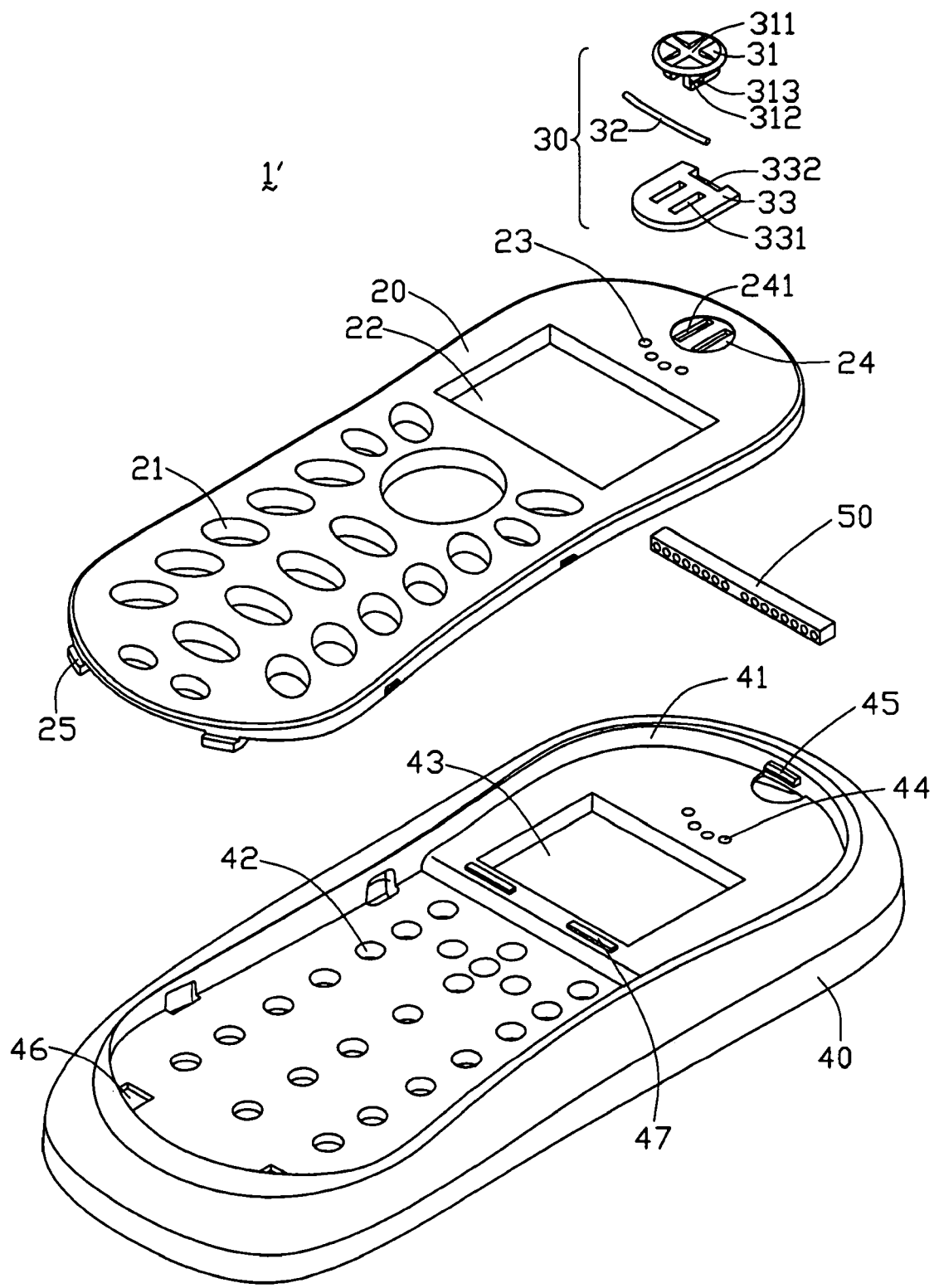
FIG. 7 is an exploded, isometric view of a replaceable panel device in accordance with a second embodiment of the present invention.
Figure 8:
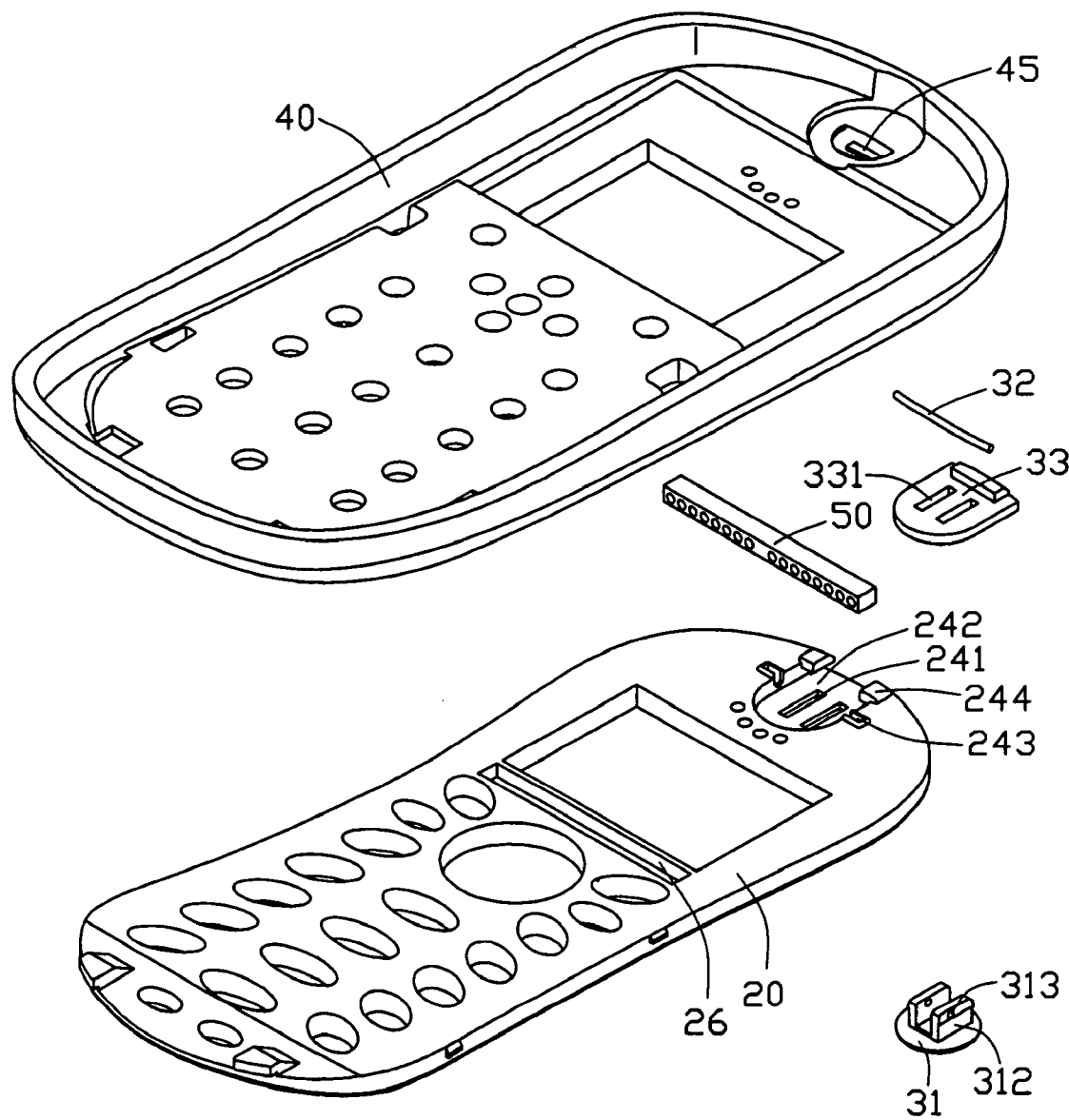
FIG. 8 is an exploded, isometric view of the replaceable panel device shown in FIG. 7, but viewed from a reverse direction.

FIGS. 7-8 show a replaceable panel device 1' in accordance with a second embodiment of present invention. The replaceable panel device 1' is substantially the same as the replaceable panel device 1 of the first embodiment, except that an elongate elastic element 50 is mounted between the panel 20 and the top cover 40. The elastic element 50 can be made of porous material. The elastic element 50 is accommodated in an elongate trough 26 of the panel 20. A pair of saliences 47 is defined in the housing 41, corresponding to the trough 26.

Assembly of the replaceable panel device 1' is substantially the same as that described above in relation to the replaceable panel device 1. In addition, the elastic element 50 is received in the trough 26 and partially compressed by the saliences 47. When removing the panel 20 from the top cover 40, the button 31 is pushed, and the block 45 is disengaged from the rabbet 332. The elastic element 50 decompresses, and forces the panel 20 upward. This facilitates the operator in removing the panel 20 from the top cover 40. There is no need for the operator to invert the handset.

In a further alternative embodiment, the above-described interengaging structures of the locking subassembly 30 and the top cover 40 can be effectively interchanged. That is, the rabbet 332 of the slider 33 can be replaced by a flange, and the block 45 of the top cover 40 can be replaced by a concavity.

In summary, the replaceable panel device 1, 1' has the panel 20 and the top cover 40 attached together by the locking subassembly 30, which comprises the button 31 and the elastic rod 32. When the button 31 is pushed, the panel 20 can be easily separated from the top cover 40 with the assistance of gravity and/or the assistance of the elastic element 50. Conversely, when the button 31 is released, the rabbet 332 of the slider 33 engagingly receives the block 45 of the top cover 40. Because the elastic rod 32 resists bending, the panel 20 is firmly secured in position on the top cover 40.

Although the present invention has been described with reference to specific embodiments, it should be noted that the described embodiments are not necessarily exclusive, and that various changes and modifications may be made to the described embodiments without departing from the scope of the invention as defined by the appended claims.

We claim:

1. A replaceable panel device for a handset comprising:
 a panel with a mounting portion which comprises at least one slideway, a recess, and two locating grooves;
 a locking subassembly which is accommodated in the mounting portion of the panel, the locking subassembly comprising a button, an elastic rod, and a slider, the button comprising at least one rail, said rail defining a hole, the slider defining at least one slot and a rabbet; and
 a top cover with a block;
 wherein the slider is received in the recess, said rail is received through said slideway and said slot, the elastic rod is received through the hole, ends of the elastic rod are located in the locating grooves, and the rabbet engagingly receives the block of the top cover in order to secure the panel to the top cover.

2. The replaceable panel device in accordance with claim 1, wherein the slideway runs through the panel, and is in communication with the recess.

3. The replaceable panel device in accordance with claim 2, wherein the locating grooves are at respectively opposite sides of and in communication with the recess.

4. The replaceable panel device in accordance with claim 3, wherein a protrusion is formed at one side of the recess.

5. The replaceable panel device in accordance with claim 1, wherein said rail is slidably received in said slideway.

6. The replaceable panel device in accordance with claim 5, wherein said slot has a width slightly greater than a corresponding width of said rail.

7. The replaceable panel device in accordance with claim 1, wherein the panel further comprises an elastic element.

8. The replaceable panel device in accordance with claim 7, wherein the panel further comprises a trough.

9. The replaceable panel device in accordance with claim 8, wherein the top cover further comprises a salience corresponding with the trough.

10. The replaceable panel device in accordance with claim 7, wherein the elastic element is made of porous material.

11. The replaceable panel device in accordance with claim 1, wherein the panel further comprises a plurality of protuberances defined at a peripheral edge thereof.

12. The replaceable panel device in accordance with claim 11, wherein the top cover further comprises a housing for accommodating the panel.

13. The replaceable panel device in accordance with claim 12, wherein the housing of the top cover defines a plurality of notches for receiving corresponding protuberances of the panel.

14. A replaceable panel device for a handset comprising:
 a panel with a mounting portion which comprises at least one slideway, a recess, and two locating grooves;

a locking subassembly which is accommodated in the mounting portion of the panel, the locking subassembly comprising a button, an elastic rod, and a slider, the button comprising at least one rail, said rail defining a hole, the slider comprising at least one slot and a block; and a top cover with a rabbet;

wherein the slider is received in the recess, said rail is received through said slideway and said slot, the elastic rod is received through the hole, ends of the elastic rod are located in the locating grooves, and the block engagingly receives the rabbet of the top cover for securing the panel to the top cover.

15. A replaceable panel device for a handset comprising:

a panel comprising a mounting portion, an elastic element, and a trough, the mounting portion comprising at least one slideway, a recess, and two locating grooves, wherein the elastic element is received in the trough;

a locking subassembly which is accommodated in the mounting portion of the panel, the locking subassembly comprising a button, an elastic rod, and a slider, the button comprising at least one rail, said rail defining a hole, the slider comprising at least one slot and a rabbet; and a top cover with a block, and a salience corresponding with the trough;

wherein the slider is received in the recess, said rail is received through said slideway and said slot, the elastic rod is received through the hole, ends of the elastic rod are located in the locating grooves, and the rabbet engagingly receives the block of the top cover in order to secure the panel to the top cover.

16. The replaceable panel device in accordance with claim 15, wherein the elastic element is made of porous material.

17. A replaceable panel device for a handset comprising:

a panel comprising a mounting portion, an elastic element, and a trough, the mounting portion comprising at least one slideway, a recess, and two locating grooves, wherein the elastic element is received in the trough;

a locking subassembly which is accommodated in the mounting portion of the panel, the locking subassembly comprising a button, an elastic rod, and a slider, the button comprising at least one rail, said rail defining a hole, the slider comprising at least one slot and a block; and a top cover with a rabbet, and a salience corresponding with the trough;

wherein the slider is received in the recess, said rail is received through said slideway and said slot, the elastic rod is received through the hole, ends of the elastic rod are located in the locating grooves, and the block engagingly receives the rabbet of the top cover in order to secure the panel to the top cover.

18. The replaceable panel device in accordance with claim 17, wherein the elastic element is made of porous material.

* * * * *